June 7, 1955

T. G. HARE 2,710,164

SELF CLOSING VALVE AND SEAL

Filed June 16, 1952

INVENTOR.
TERENCE G. HARE
BY
Barnes, Kissell, Laughlin & Raisl

ATTORNEYS.

United States Patent Office 2,710,164
Patented June 7, 1955

2,710,164
SELF-CLOSING VALVE AND SEAL

Terence G. Hare, Detroit, Mich., assignor to Miller Manufacturing Co., Detroit, Mich., a corporation of Michigan Application June 16, 1952, Serial No. 293,804

3 Claims. (Cl. 251—278)

This invention relates to valves of the automatic closing type.

The objects of the invention include the provision of a valve of the automatically closing type which has a positive sure action and yet one which is so designed and constructed that it can be produced economically. The valve is one which may employ a valve body of substantially standard construction and in this regard is comparable to valves of the conventional hand closing type. It is an object of the invention to provide a valve construction operable into closed position by a helical spring which may be positioned around and co-axial with an operating stem. The construction is such that the tension of the spring may be easily adjusted. A further object of the invention is to provide a rotary type of valve member operating on a screw thread and wherein a sealing device is employed for sealing against leakage of the conducted fluid which sets up a minimum of resistance to the turning of the valve member. This friction is substantially constant and thus a sure action of the valve is obtained by turning of the valve member by the coil spring.

Heretofore, the rather common hand operated valve of the faucet type employed packing material for sealing purposes and it often happened that the packing was adjusted so tightly that a considerable turning effort was required to turn the rotary member. As distinguished from this the present invention embodies a relatively light sealing pressure afforded by an easily flexible sealing disc in the nature of a washer. A valve of the faucet type constructed in accordance with the present invention is shown in the accompanying drawings.

Figure 1:
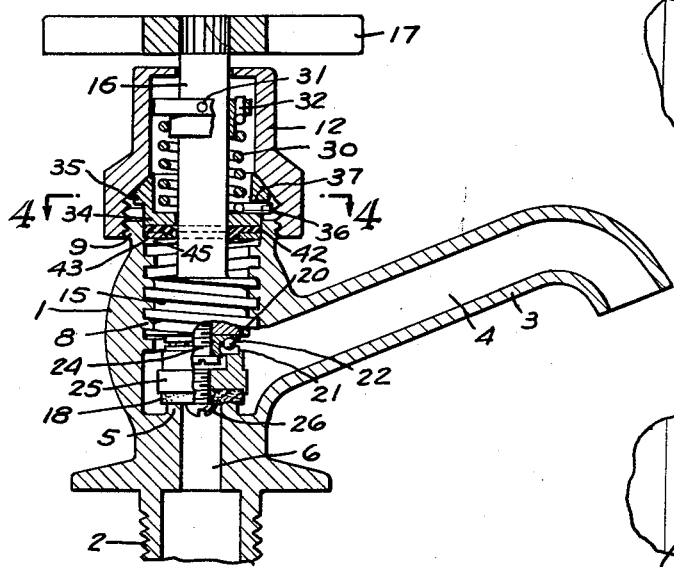
Fig. 1 is a cross sectional view of a faucet constructed in accordance with the invention illustrating the same in closed position.

The body of the faucet or valve is illustrated at 1 having a threaded extension 2 for connection to a suitable conduit, an outlet extension or spigot 3 with the hollow formation providing the outlet chamber 4 and a valve seat 5 at the inlet passage 6. The body is provided with internal screw threads 8 and it may have external screw threads 9 for the reception of a suitable cap or closure member 12.

A rotary valve member has a threaded body portion 15 in engagement with the threads 8 and an operating stem 16 which extends out through the cap and which is provided with a suitable handle 17.

Secured to the rotary valve member is a sealing device having a sealing member or washer 18 for seating upon the valve seat 5. The sealing member is secured to the rotary valve member so that it is rotatable relative thereto and to this end the structure preferably embodies an arrangement with an anti-friction bearing of the type disclosed in the Terence G. Hare Patent No. 2,281,689.

Briefly, an anti-friction bearing structure embodying an upper race 20 and a lower race 21 with ball bearings 22 therebetween is attached to the rotary valve member as by means of a screw 24. An adapter member 25 is secured to the lower race and the sealing washer 18 is secured to the adapter as by means of a screw 26. Thus the sealing member and the adapter and the lower race can rotate on the ball bearing mounted relative to the rotary valve member. There is a coil spring 30 positioned around the stem 16 with adequate clearances with respect to the stem and cap 12 for its flexure in operation and the upper end of the spring is secured to the stem. One way of securing the end of the spring to the stem is to provide the stem with a collar 31, which may be pinned to the stem, as shown, into which the end 32 of the spring is projected.

Positioned between the cap and the valve body is a cup member 34 having an opening in its bottom through which the stem extends and having a rim 35 which advantageously knurled or roughened as shown at 35. The opposite end of the spring as at 36 is turned outwardly and passed through an aperture 37 in the wall of the cup. Thus the lower end of the spring is keyed, so to speak, to the cup which is an adjusting member. The valve body has a plurality of recesses in its upper edge as shown at 40 and the end of the spring 36 projects sufficiently beyond the wall of the cup to be received in one of these recesses.

Underlying the bottom of the cup is a sealing washer 42 and underlying the sealing washer is a metal washer 43 arranged to seat upon a shoulder 45 in the valve body. The shoulder 45 may be the topmost internal thread the top surface of which is in a plane perpendicular to the axis of the stem. It will be noted that the internal diameter of the washer 43 is such that the opening therethrough has some considerably clearances with respect to the stem 16. The normal internal diameter of the sealing washer 42 is less than the cross dimension or diameter of the stem. The sealing washer is of a flexible material, such as rubber, and preferably of a synthetic rubber such as Neoprene. The term "rubber" is convenient to use and it is used herein in a broad sense.

In making the assembly, the valve member is positioned on the internal threads and it may be turned to closed position. By closed position, is meant that the sealing member 18 is seated on the seat 5. Then the operator may grasp the knurled edge of the flange 35 of the cup and may rotate the cup thus tensioning the spring. When the spring is sufficiently tight or wound up to the desired extent, the end 36 is caused to be caught in one of the recesses 40 of the valve body. Thus the torque of the coil spring tends to turn the stem and hold the valve member 18 on its seat. The cap 12 may now be applied and it is screwed down tightly. In this action the cap shoulder engages the rim of the cup and urges it downwardly and causes the washer 43 to seat upon the shoulder 45 thus tightly engaging the sealing washer 42 between the bottom of the cup and the washer 43. Thus although the washer 42 is tightly engaged, its inner zone which overlies the opening of the washer 43 is relatively free on its underside. After the cap has been tightened the handle 17 may be applied.

To open the valve the handle 17 is manipulated to turn the stem 16 and thus cause the threaded valve member 15 to turn on the internal threads 8. The valve member 18 thus is lifted from its seat so that fluid may flow from the inlet 6 into the spigot passage 4. When the handle 17 is released the wound up coil spring turns the valve member so that the valve seal 18 is applied to its seat thus closing the valve. This is where the antifriction connection between the valve seal washer 18 and the valve member 15 is important. The spring is not called upon to turn the sealing washer 18 relative to its seat. After the valve member 18 comes to rest upon its seat, the spring may continue to turn the threaded body member 15 to tighten the engagement.

Figure 2:
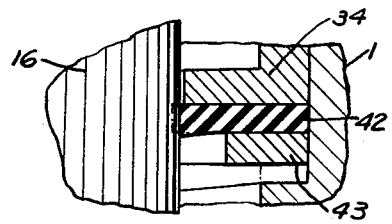
Fig. 2 is an enlarged sectional view showing a sealing member in sealing position.
Figure 3:
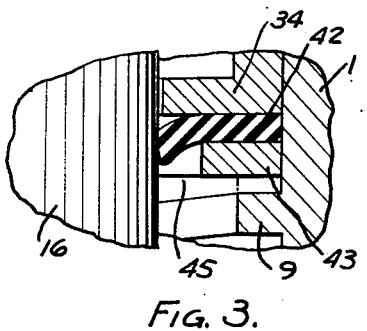
Fig. 3 is a sectional view similar to Fig. 3 showing the sealing member when the faucet is closed and no sealing action required.
Figure 4:
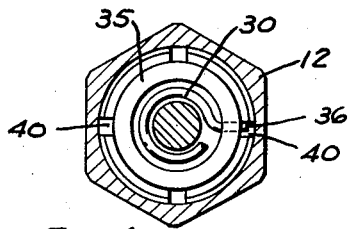
Fig. 4 is a sectional view taken substantially on line 4—4 of Fig. 1 illustrating the stem and spring and showing an adjusting cup member.
Figure 5:
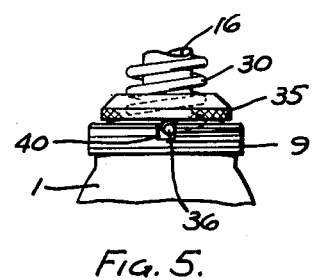
Fig. 5 is a view illustrating the construction for tensioning the spring.

The seal washer 42 is, of course, intended to prevent the water or other fluid from escaping through the cap around the stem and it is desired to have a seal which places a minimum of friction on the stem. When the valve is opened by the turning of the handle 17 the stem 16, of course, shifts upwardly as Figs. 1, 2 and 3 are viewed and the rubber washer 42 takes the position somewhat as illustrated in Fig. 2. Now since the opening in the washer 42 is smaller than the cross dimension of the stem, the washer snugly engages the stem and provides a seal. The top of the washer is adequately backed up by the bottom of the cup. In the action of the closing of the faucet the stem 16 shifts downwardly while rotating and the inner zone of the sealing washer 42 flexes downwardly as illustrated in Fig. 3. The sealing washer will maintain substantially this position all the while the faucet is closed as it is not called upon to provide a sealing function when the faucet is closed. Thus the spring does not have to overcome a heavy frictional load, such as is often present with an ordinary packing gland. In other words it might be stated that the inner zone of the flexible sealing washer 42 flexes from the Fig. 2 position to the Fig. 3 position with very little force. Moreover, the frictional resistance remains substantially constant throughout a long period of time.

Figure 6:
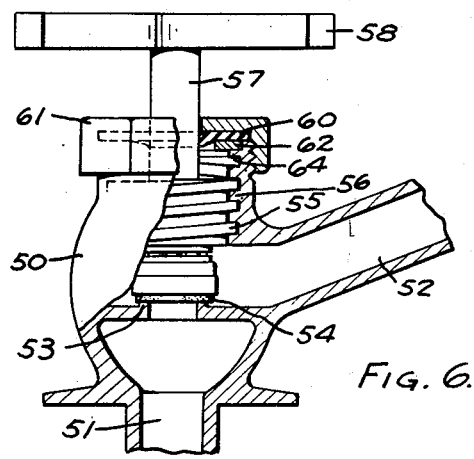
Fig. 6 is a view, partly in section, illustrating the seal employed with a hand operated faucet.

This type of sealing washer may be used with a hand operated valve, as illustrated in Fig. 6. Here the valve body 50 has an inlet 51 and an outlet spigot 52, a valve seat 53 and a seal member 54 for engaging the same. The threaded body of the valve member 55 on threads 56 in the valve body has a stem 57 which can be turned by a suitable handle 58 to open and close the valve.

In place of the usual packing gland a flexible rubber washer 60 is provided which is tightly engaged between a cap 61 and a washer 62 which underlies the rubber sealing washer and engages a shoulder 64 when the cap is tightened. In this structure the action is the same as it is with the automatically closing valve. When the valve stem raises upon the opening of the faucet the inner zone of the rubber washer is flexed upwardly into sealing position and when the valve is turned off as shown in Fig. 6 the inner zone flexes inwardly with the inward movement of the stem. So, even though a hand operated valve be employed, the flexible washer sealing member provides a seal against leakage with a minimum of resistance and which resistance remains substantially constant.

I claim:

1. A self-closing faucet comprising, a body having an inlet passage and an outlet passage, a valve seat between the passages, internal threads on the body co-axial with the valve seat, the body having an open end, a valve member with threads thereon in engagement with the threads on the body, a seal member, means rotatably mounting the seal member on one end of the valve member, said seal member being engageable with and retractable from the valve seat incident to the axial movement of the valve member as it is turned on said threads, an operating stem projecting from the valve member, the open end of the body being of annular form and having a plurality of notches, a cap for closing the open end of the body and detachably secured to the body, said stem extending through the cap, a coil spring positioned around the stem and within the cap, means connecting one end of the coil spring to the stem, an annular member non-rotatably secured to the opposite end of the spring, said annular member being turnable relative to the body, whereby, when so turned with the cap removed and the seal member on said valve seat, the spring is flexed and placed under tension, means non-rotatable relative to the annular member and selectively engageable in one of the notches to maintain said tension of the spring independently of the cap, the cap having a surface engaging the annular member to hold it positioned with the said means engaged in a notch, and sealing means between the body and stem.

2. A self-closing faucet comprising, a body having an inlet passage and an outlet passage, a valve seat between the passages, internal threads on the body co-axial with the valve seat, the body having an open end, a valve member with threads thereon in engagement with the threads on the body, a seal member, means rotatably mounting the seal member on one end of the valve member, said seal member being engagable with and retractable from the valve seat incident to the axial movement of the valve member as it is turned on said threads, an operating stem projecting from the valve member, the open end of the body being of annular form and having a plurality of notches, a cap for closing the open end of the body and detachably secured to the body, said stem extending through the cap, a coil spring positioned around the stem and within the cap, means connecting one end of the coil spring to the stem, an annular member of cup form into which the opposite end of the spring fits, the annular member and spring being non-rotatable relative to each other, said annular member being turnable relative to the body, whereby, when so turned with the cap removed and the seal member on the valve seat, the spring is flexed and placed under tension, means non-rotatable relative to the annular member and selectively engageable in one of the notches to maintain said tension of the spring independently of the cap, a sealing washer through which the stem extends, a support underlying the sealing washer, the cap having a surface engaging the annular member to hold it positioned with said means engaged in a notch and with the bottom of the annular member engaging and holding said sealing washer.

3. A self-closing faucet comprising, a body having an inlet passage and an outlet passage, a valve seat between the passages, internal threads on the body co-axial with the valve seat, the body having an open end, a valve member with threads thereon in engagement with the threads on the body, a seal member, means rotatably mounting the seal member on one end of the valve member, said seal member being engagable with and retractable from the valve seat incident to the axial movement of the valve member as it is turned on said threads, an operating stem projecting from the valve member, the open end of the body being of annular form and having a plurality of notches, a cap for closing the open end of the body and detachably secured to the body, said stem extending through the cap, a coil spring positioned around the stem and within the cap, means connecting one end of the coil spring to the stem, an annular member in the form of a cup into which the opposite end of the spring fits, said annular member having a lateral opening therein, the extreme end of the spring extending through the opening and projecting beyond the periphery of the annular member, said annular member being turnable relative to the body, whereby, when so turned with the cap removed and the seal member on said valve seat, the spring is flexed and placed under tension, the projecting extreme end of the spring being selectively engagable in one of the notches to maintain said tension of the spring independently of the cap, said cap having a surface engaging the annular member to hold it positioned with said means engaged in a notch.

(References on following page)

References Cited in the file of this patent

UNITED STATES PATENTS

| | | |
|---|---|---|
| 159,900 | Carruthers | Feb. 16, 1875 |
| 696,434 | Hedges | Apr. 1, 1902 |
| 905,181 | Hedges | Dec. 1, 1908 |
| 1,142,145 | Collar | June 8, 1915 |
| 1,358,237 | Olson | Nov. 9, 1920 |
| 1,460,050 | Bloom | June 26, 1923 |
| 1,482,484 | Roberts | Feb. 5, 1924 |
| 1,574,017 | Beattie | Feb. 23, 1926 |
| 1,734,119 | Evinrude | Nov. 5, 1929 |
| 2,490,043 | Funk | Dec. 6, 1949 |
| 2,600,293 | Heldal | June 10, 1952 |
| 2,610,650 | Schopp | Sept. 16, 1952 |